United States Patent
Tomita

(10) Patent No.: US 6,781,340 B2
(45) Date of Patent: Aug. 24, 2004

(54) METHOD FOR DETECTING OSCILLATION CRITICALITY OF SERVO CONTROL SYSTEM

(75) Inventor: Koji Tomita, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/220,816

(22) PCT Filed: Mar. 5, 2001

(86) PCT No.: PCT/JP01/01695
§ 371 (c)(1),
(2), (4) Date: Sep. 6, 2002

(87) PCT Pub. No.: WO01/67187
PCT Pub. Date: Sep. 13, 2001

(65) Prior Publication Data
US 2003/0057901 A1 Mar. 27, 2003

(30) Foreign Application Priority Data
Mar. 6, 2000 (JP) .......................................... 2000-60529

(51) Int. Cl.⁷ .............................................. G05B 11/36
(52) U.S. Cl. ...................... 318/609; 318/610; 318/611; 318/632; 318/565; 318/432
(58) Field of Search ......................... 318/609–611, 625, 318/632, 560, 565, 432, 433, 434

(56) References Cited

U.S. PATENT DOCUMENTS 5,157,597 A    10/1992   Iwashita
5,175,479 A    12/1992   Tajima et al.

OTHER PUBLICATIONS

Miao T et al: "Automatic detection of excessively oscillatory feedback control loops" Control Applications, 1999. Proceeding s of the 1999 IEEE International Conference on Kohala Coast, HI, USA Aug. 22–27, 1999, Piscataway, NJ, US, Aug. 22, 1999, pp. 359–364, XP010356408.

Japanese Patent Abstract No. 10143249, dated May 29, 1998.

*Primary Examiner*—Rina Duda
(74) *Attorney, Agent, or Firm*—Sughrue Mion, PLLC

(57) ABSTRACT

Control parameters are regulated without oscillating a servo control system. Respective control parameters $P[p]$ ($p=0, 1 - - -$), arranged in the order of gradually increasing a chance of oscillating the servo control system, are set sequentially starting with $P[0]$, a torque command Tr or a fluctuation amount $\sigma$, showing a variation in frequency component of vibration of a speed feedback amount $\omega$, is determined for each of control parameters, and the servo control system is assumed to have reached an oscillation criticality when a fluctuation amount exceeds a specified value to thereby reset a control parameter set at that time to $P[p-q]$ (q; natural number) or to $P[0]$.

8 Claims, 7 Drawing Sheets

TRANSITION RESPONSE WHEN INERTIA OF MACHINE 6 IS J
TRANSITION RESPONSE WHEN INERTIA OF MACHINE 6 IS 2J

METHOD FOR DETECTING OSCILLATION CRITICALITY OF SERVO CONTROL SYSTEM

TECHNICAL FIELD

The present invention relates to a method for detecting the oscillation criticality of a servo control system and adjusting control parameters.

BACKGROUND ART

Usually, in order to control an object to be controlled in a servo control system, feedback control is carried out, by which an amount of operation with respect to the object to be controlled is acquired from a deviation between a command issued from an upper-level apparatus and an actual amount of control. FIG. 5 is a block diagram showing a construction of a servo control system by which speed control is carried out. The servo control system is composed of a subtractor 1, a speed controller 2, a torque amplifier 3, a servo motor (M) 4, an encoder (E) 5, a machine 6, and a differentiator 7. The speed controller 2 is a means for controlling the machine 6, which is an object to be controlled, and is a proportion-integration-differentiation unit (hereinafter called a "PID controller"). Herein, Kv, Ki and Kd are control parameters of the speed controller 2. Kv is a proportional gain, Ki is a reciprocal number of an integration time constant, and Kd is a differentiation time.

The subtractor 1 subtracts a speed feedback ω from a speed command ωr inputted from an upper-level apparatus (not illustrated), and outputs a speed deviation. The speed controller 2 carries out PID control by inputting the speed deviation and outputs a torque command Tr. The torque amplifier 3 outputs a current to the servomotor 4 by inputting the torque command Tr. The servomotor 4 rotates by the current and the machine 6 moves by the rotation movement. The encoder 5 is attached to the servomotor 4 and outputs the rotation position of the servomotor 4. The differentiator 7 differentiates the rotation position, which is outputted from the encoder 5, and outputs a speed feedback ω. Also, in the case where the above-described servo control system is a digital control system that carries out control per sampling cycle, usually, there are many cases where, using a difference detector instead of the differentiator 7, a difference between the previous rotation position and this rotation position is made into the speed feedback ω.

FIG. 6 is an equivalence block diagram of the servo control system shown in FIG. 5. In FIG. 6, a description is based on the assumption that the machine 6 is completely rigid, the response of the torque amplifier 3 is ideal for simplifying the description thereof, and the speed controller 2 carries out proportional control on the basis of only the proportional gain Kv. FIG. 6(a) is an equivalence block diagram of a servo control system where an inertia of the machine 6 is assumed to be J, and FIG. 6(b) is an equivalence block diagram of a servo control system where an inertia of the machine 6 is assumed to be 2J. Herein, it is also assumed that values of the proportional gains Kv in FIGS. 6(a) and (b) are the same.

FIG. 7 is a graph showing a transition response of the speed feedback ω with respect to a step-like speed command ωr in FIGS. 6(a) and (b). As shown in FIG. 7, where the inertia of the machine 6 is changed from J to 2J, it is understood that the response of the servo control system changes and the followability of the servo control system is worsened.

Therefore, in such a servo control system, in a case where parameters of an object to be controlled such as the inertia of the machine 6 is changed, it is necessary to vary the control parameters such as the proportional gain Kv of the speed controller 2 in response to the value of the inertia so that the machine 6 is optimally controlled. However, if the control parameters such as the proportional gain Kv are thoughtlessly changed, there may be a cause a concern that oscillations occur due to resonance of the mechanical system including the machine 6 and useless time of the servo control system, etc. Generally, the larger the proportional gain Kv becomes, the greater the followability to the speed command ωr is increased. But, if the proportional gain Kv is increased too much, the servo control system is likely to oscillate.

It is assumed that, among the values of the proportional gains Kv, an area of values of the proportional gain Kv is defined to be Area "a" when the servo control system does not oscillate and is in a stable state, an area of values of the proportional gain Kv is defined to be Area "b" when the servo control system is in oscillation criticality, and an area of values of the proportional gain Kv is defined to be Area "c" when the servo control system is in a completely oscillating state. FIG. 8 are graphs showing a frequency response G(f) of the speed feedback ω in terms of a logarithm when the values of the proportional gain Kv are in respective areas.

FIG. 8(a) shows a state of log G(f) where the values of the proportional gain Kv are in Area "a", wherein log G(f) has a small peak in the vicinity of f=0, and the value of log G(f) is totally low. FIG. 8(b) shows a state of log G(f) where the values of the proportional gain Kv are in Area "b", wherein, although log G(f) is distributed in a wide frequency band, the peak thereof is not so high. FIG. 8(c) shows a state of a frequency response log G(f) where the values of the proportional gain Kv are in Area "c", wherein log G(f) has a very high peak at a certain frequency band. It is understood that the servo control system oscillates in this frequency band. In addition, the frequency response of the torque command Tr shows a tendency similar to the frequency response of the above-described speed feedback ω.

As described above, the control parameters such as the proportional gain Kv causes the followability of the servo control system to be worsened if the values thereof are small, and brings about oscillations in the servo control system if the values thereof are large. Therefore, it is recommended that the control parameters such as the proportional gain Kv are set to optimal values.

As a method for optimally obtaining control parameters such as the proportional gain Kv, etc., such a method is disclosed by Japanese Patent Publication No. 2861394, in which an amplitude and a frequency of fluctuations of the speed feedback ω in an appointed duration of time are calculated, and the control parameters are adjusted by judging that, if the amplitude value and frequency value exceed appointed values, oscillations have occurred. However, with the method disclosed by the above-described patent publication, the control parameters cannot be adjusted unless actual oscillation occurs. For this reason, where this method is used, actual oscillation occurs before commencing to adjust the control parameters, whereby such problems are brought about, by which the machine 6 connected to the servomotor 4 may be damaged due to influences of the oscillation, or large noise may be generated.

On the other hand, it is experimentally made clear that shaking of the speed feedback ω and torque command Tr changes in response to fluctuations in the proportional gain Kv. The shaking of the speed feedback ω and torque command Tr means unevenness of frequency components in oscillations of the speed feedback ω and torque command Tr. FIG. 9 is a graph showing the relationship between the proportional gain Kv and the shaking amount of the speed feedback ω. Where the value of the proportional gain Kv is in Area "a", the shaking amount of the speed feedback ω is small. And where the value of the proportional gain Kv is in Area "b", the shaking amount of the speed feedback ω is gradually increased in line with an increase in the value of the proportional gain Kv. In Area "c", that is, the oscillation area, although the speed feedback ω consistently oscillates, the frequency components of the oscillations are made almost constant, wherein the shaking amount is made small. Such a tendency is also brought about with respect to the shaking amount of the torque command Tr.

As described above, conventionally, when adjusting the control parameters in the servo control system, the amplitude and frequency of fluctuations of the speed feedback in an appointed duration of time are calculated, wherein if the amplitude and frequency exceed appointed values, it is judged that the servo control system oscillates, and the control parameters are adjusted. However, with this method, the control parameters cannot be adjusted unless actual oscillations begin. Accordingly, where the method is used, actual oscillations occur before commencing to adjust the control parameters, wherein there occur such problems, by which a machine connected to the servomotor is damaged due to influences of the oscillations, and large noise is generated.

DISCLOSURE OF THE INVENTION

It is therefore an object of the present invention to provide a method for detecting oscillation criticality of a servo control system that can adjust control parameters without causing the servo control system to oscillate.

In order to solve the above-described problem, the present invention is a method for detecting oscillation criticality of a servo control system, which can adjust control parameters of means for controlling an object to be controlled, by carrying out, per sampling cycle, input of a deviation between the amount of control fed back from a servomotor to drive the above-described object to be controlled and a command value inputted from an upper-level apparatus, and output of a torque command to a torque amplifier that outputs a current to the servomotor, comprising the steps of:

stepwise changing values of control parameters, and measuring a shaking amount being uneven in a frequency component of oscillations of the above-described variable per value of the control parameters;

judging that, when the above-described shaking amount exceeds an appointed value, the servo control system reaches oscillation criticality; and adjusting the above-described control parameters by returning the values of the control parameters, which are set in the above-described controlling means, by only appointed steps.

The method for detecting oscillation criticality of a servo control system according to the invention can detect values of control parameters set when the servo control system reaches the oscillation criticality by detecting the shaking amount, that is, unevenness in a frequency component of oscillations of a variable that is maximized when the servo control system is in oscillation criticality, whereby the control parameters can be adjusted without causing the servo control system to oscillate.

As described above, the method for detecting oscillation criticality of a servo control system according to the invention can detect control parameters, when the servo control system is in oscillation criticality, by obtaining the shaking amount, that is, unevenness in frequency of oscillations of a torque command or speed feedback, which is maximized in the oscillation criticality area of the servo control system, whereby the control parameters can be adjusted without causing the servo control system to oscillate.

BEST MODE FOR CARRYING OUT THE INVENTION

Next, a detailed description is given of a method for detecting oscillation criticality of a servo control system according to one embodiment of the invention with reference to the accompanying drawings. In all the drawings, components that are given the same reference numbers are identical to each other.

Figure 9:
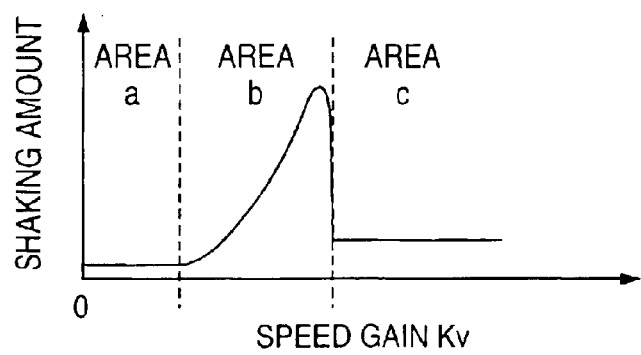
FIG. 9 is a graph showing the relationship between a proportional gain Kv and shaking of the speed feedback ω.

The method for detecting oscillation criticality of a servo control system according to the present embodiment is a method in which the focus is on the relationship between control parameters such as a proportional gain Kv, a reciprocal Ki of integration time constant, and differential time Kd, which are shown in FIG. 9, and shaking, that is, unevenness of frequency components of oscillation of a torque command Tr and speed feedback ω. In the method for detecting oscillation criticality of a servo control system according to the embodiment, values of the control parameters are stepwise increased, and at the same time, the shaking amount of the torque command Tr and speed feedback ω is measured in the values of the control parameters, wherein where the shaking amount exceeds an appointed amount, it is judged that the servo control system reaches oscillation criticality, and the control parameters are adjusted by returning the values of the control parameters to be set, by an appointed step toward the original values.

Figure 1:
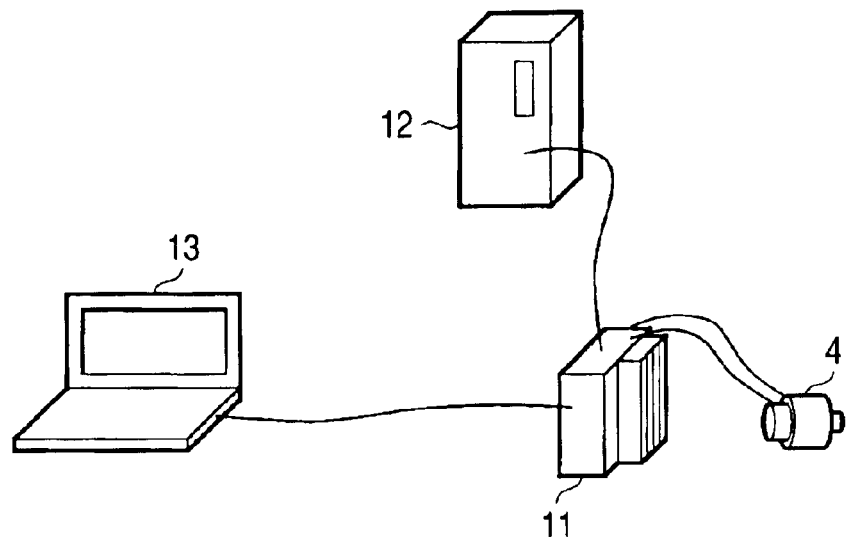
FIG. 1 are perspective views showing a construction of a servo control system in a method for detecting oscillation criticality of the servo control system according to one embodiment of the invention.
Figure 1:
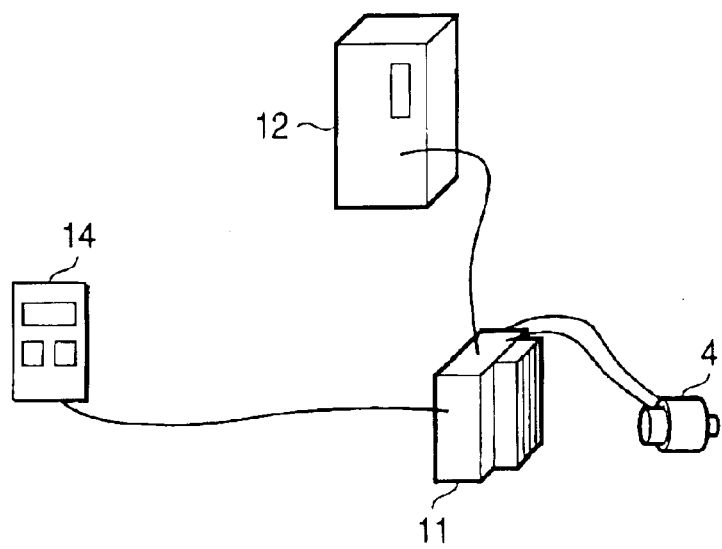
Figure 5:
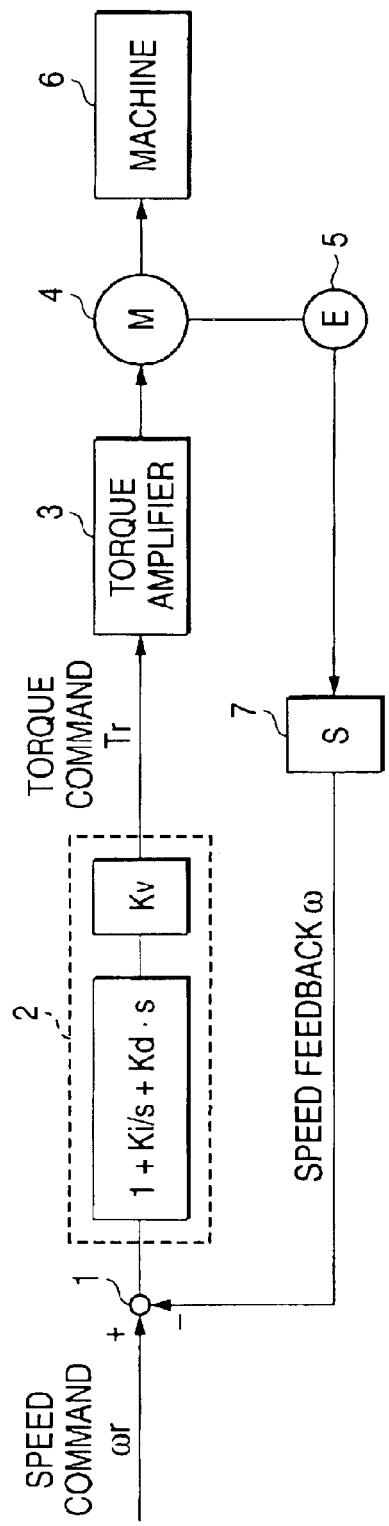
FIG. 5 is a block diagram showing a construction of a servo control system that carries out speed control.
Figure 6:
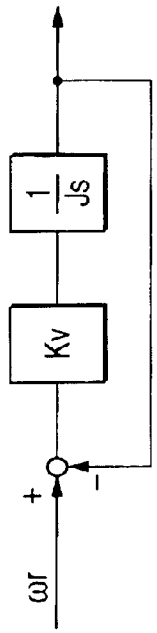
FIG. 6 are equivalence block diagrams of the servo control system of FIG. 5.
Figure 6:
Figure 7:
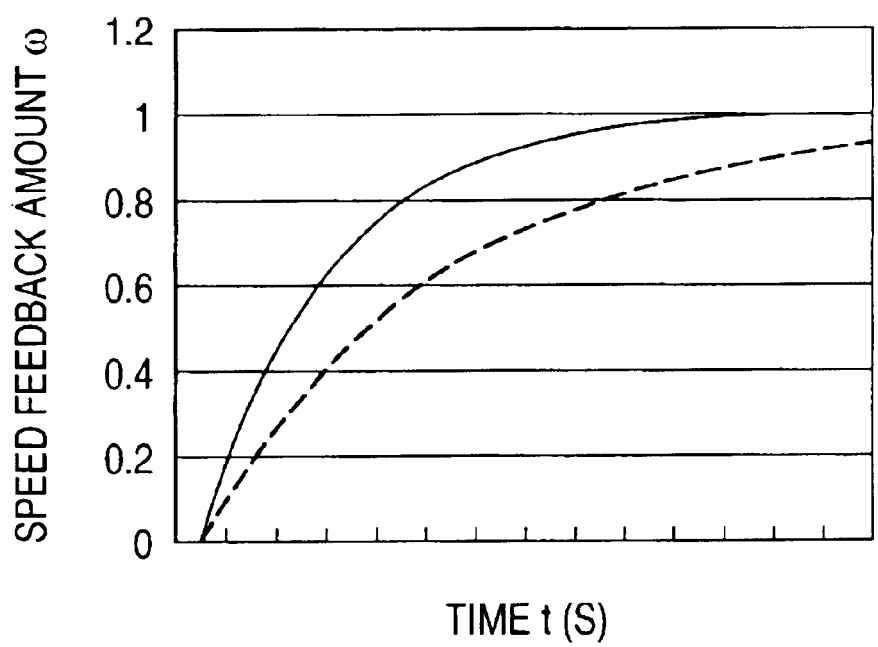
FIG. 7 is a graph showing the transition response of a speed feedback ω with respect to a step-like speed command ωr.
Figure 8:
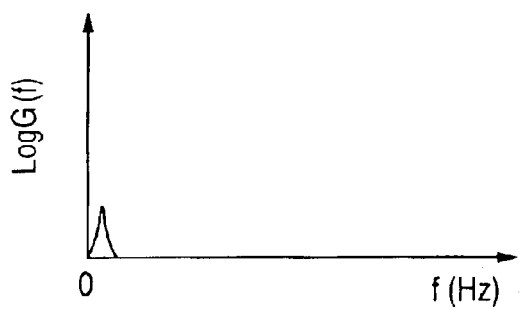
FIG. 8 are graphs showing frequency response log G(f) of the speed feedback ω.
Figure 8:
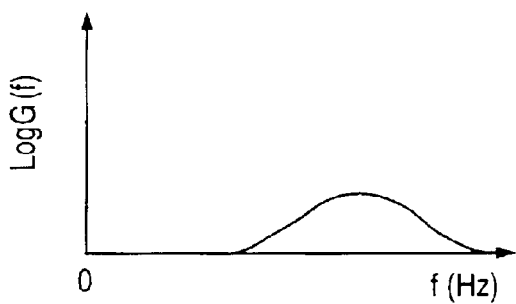
Figure 8:
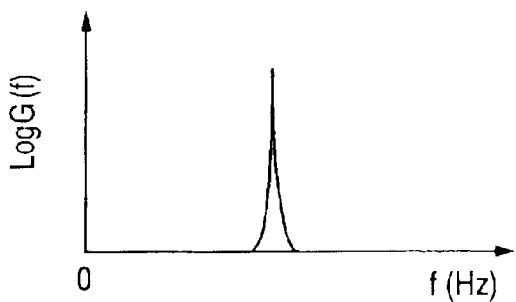

As shown in FIGS. 1(a) and (b), in the method for detecting oscillation criticality of a servo control system according to the present invention, a personal computer 13 or a teaching pendant 14 is connected to a servo control apparatus 11. The personal computer 13 or teaching pendant 14 is used when inputting control parameters into the servo control apparatus 11, and displays the results of adjustment, etc., of the control parameters. Hereinafter, to simplify the description, the personal computer 13 or teaching pendant 14 is merely called an "input/output unit". Also, the servo control apparatus 11 is provided with a speed controller 2 and a torque amplifier 3, which are shown in FIG. 5. The control parameters of the speed controller 2 are adjusted while inputting a speed command ω from an upper-level apparatus 12.

In the method for detecting oscillation criticality of a servo control system according to the embodiment, several values of control parameters are prepared in advance. These are called P[0], P[1], P[2], .... These control parameters are arranged in such an order that it becomes difficult for the servo control system to oscillate. For example, the control parameters are P[0]<P[1]<P[2], ...

Figure 2:
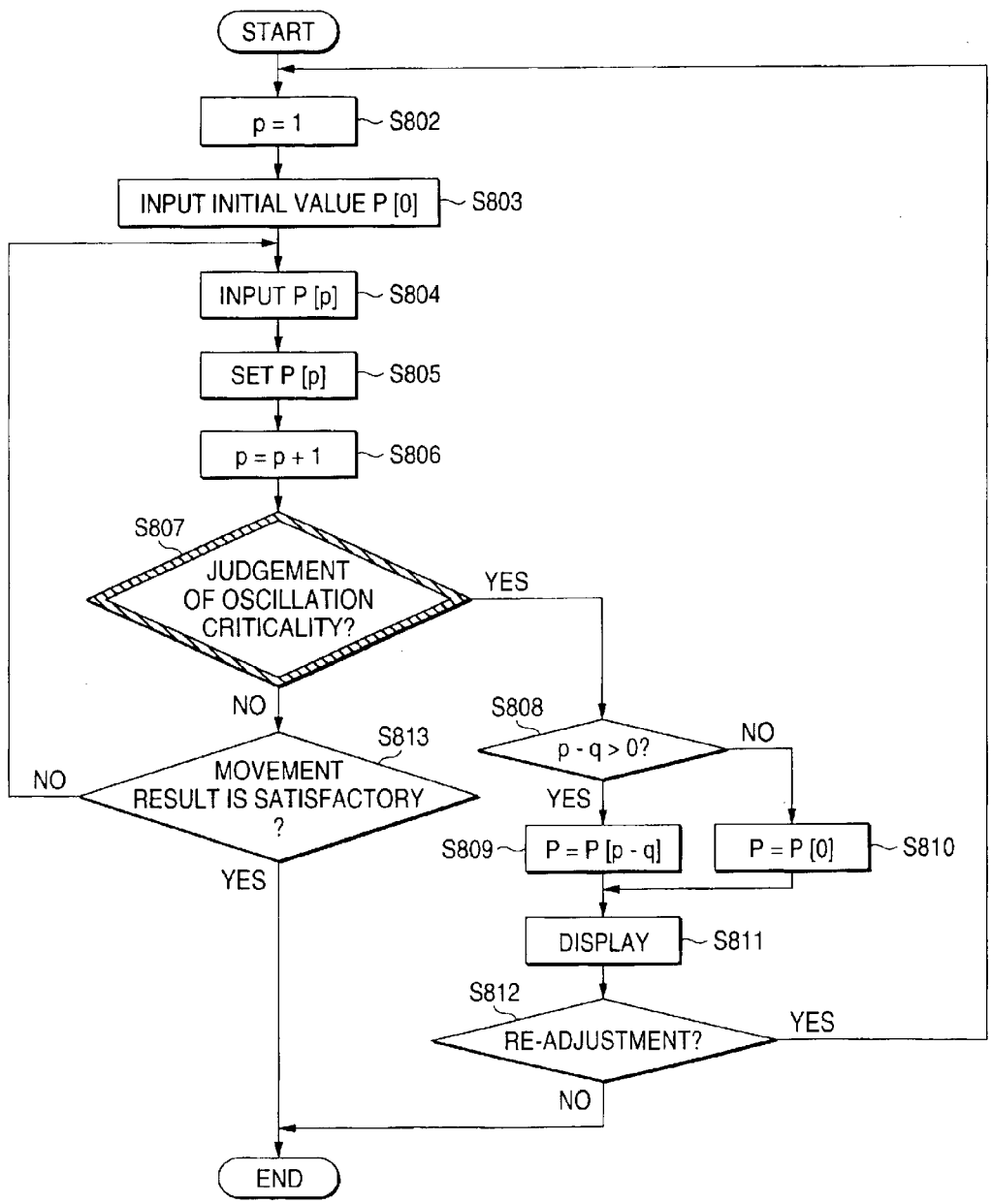
FIG. 2 is a flowchart showing a method for detecting oscillation criticality of a servo control system according to the embodiment of the invention.

FIG. 2 is a flowchart showing the method for detecting oscillation criticality of a servo control system according to the present embodiment. Herein, reference letter p denotes an index value of a control parameter that is currently set, and reference letter q denotes a value, which is a natural number more than 1 and is defined in advance. In the method for detecting oscillation criticality of a servo control system according to the present embodiment, where it is judged that oscillation criticality occurs when P[p] is set, P[p−q] that is q steps before P[p] is set in the servo control apparatus 11 as a control parameter.

First, 1 is set in p (Step S802). Next, the control parameter P[0] is inputted from the input/output unit into the servo control apparatus 11 (Step S803). Next, a control parameter P[p] is inputted from the input/output unit into the servo control apparatus 11 (Step S804), and a control parameter P[p] is set in the servo control apparatus 11 (Initially, since p=1 is set, P[1] is set) (Step S805). And, p is incremented (Step S806). And, it is judged whether or not the servo control system is in oscillation criticality (Step S807). Where it is judged that the servo control system is not in oscillation criticality, it is judged whether or not a movement of the servo control system at the set control parameter meets a required control capacity, wherein if not satisfactory, the process returns to Step S804, and if satisfactory, the process ends.

In addition, in Step S807, where the servo control system is in oscillation criticality, it is judged whether or not p is larger than q (Step S808). Where p is larger than q, P[p−q] is set in the servo control apparatus 11 as the optimal parameter control (Step S809), and where p is smaller than q, P[0] is finally set in the servo control apparatus 11 as an optimal control parameter (Step S810). And, it is displayed in the input/output unit that oscillation criticality has been reached, and the control parameter has been changed (Step S811), and it is further displayed whether or not re-adjustment is carried out (Step S812). Where the re-adjustment is carried out, the process returns to Step S802, and where the re-adjustment is not carried out, the process ends.

In Step S807, criticality judgment is carried out by obtaining the shaking amount of the torque command Tr. In the method for detecting oscillation criticality of a servo control system according to the invention, first, a torque command value Tr[i] is sampled once every sampling cycle Ts, the number N[m] of times of inverting the sign is calculated, which is the number of times for which the sign of a difference obtained by subtracting the torque command value Tr[i−1] from the torque command value Tr[i] during an appointed number $I_0$ of sampling times is inverted. And, the calculation of the number N[m] of times of inverting the sign is carried out by an appointed number $M_0$ of times, and the standard deviation value σ of the plural number N[m] of times of inverting the signs obtained is calculated, wherein the standard deviation value σ is made into the shaking amount σ at the control parameter, wherein it is assumed that $0 \leq i < I_0$ and $0 \leq m < M_0$ are set.

Figure 3:
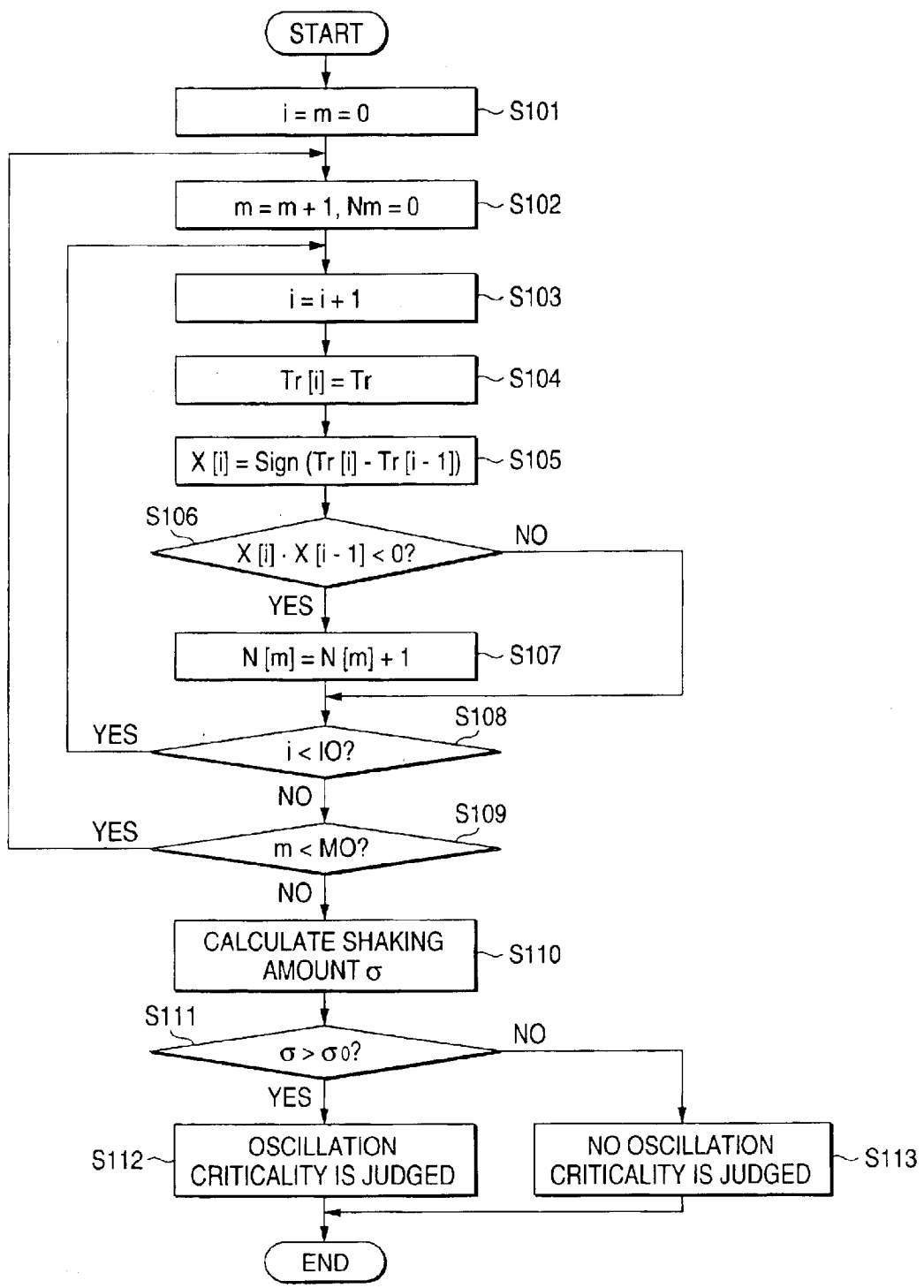
FIG. 3 is a flowchart showing movements when obtaining a shaking amount in the method for detecting oscillation criticality of the servo control system according to the embodiment of the invention.

FIG. 3 is a flowchart showing movements when obtaining the shaking amount σ in the method for detecting oscillation criticality of a servo control system according to the invention. In the method for detecting oscillation criticality of servo control system according to the embodiment, first, i and m are initialized (Step S101). And, m is incremented, and Nm is initialized (Step S102). A sampling time i is incremented (Step S103). Next, this time torque command value Tr[i]is acquired (Step S104). And, on the basis of the previous torque command value Tr[i−1] and the present torque command value Tr[i], a calculation is carried out with respect to the following expression (Step S105).

$$Xi = \text{Sign}(Tr[i] - Tr[i-1]) \quad (1)$$

Sign ( ) is a function that returns 1 where the sign of a figure in the bracket ( ) is positive and returns −1 where the sign thereof is negative. Next, on the basis of the product obtained from the present calculated X[i] and the previous calculated X[i−1], it is judged whether or not the signal of X[i] is inverted (Step S106). In Step S106, where the signal of X[i] is inverted, the number N[m] of times of inverting the sign is incremented (Step S107). In Step 106, where the sign of X[i] is not inverted, the incrementing of the number N[m] of times of inverting the sign is not carried out.

Next, it is judged whether or not i is larger than an appointed value $I_0$ (Step S108). If the i is smaller than the appointed value $I_0$, the process returns to Step S102. Where the i is larger than the appointed value $I_0$ in Step S108, it is judged whether or not m is larger than an appointed value $M_0$ (Step S109). If the m is smaller than the appointed value $M_0$, the process returns to step S102. If the m is larger than the appointed value $M_0$, the shaking amount σ is obtained by the following expression 1.

$$\sigma = \sqrt{(1/Mo) \sum_{j=0}^{Mo-1} (N[j] - \langle N \rangle)^2} \quad \text{Expression 1}$$

where <N> is the average value ($0 \leq m < M_0$) of N[m]

Figure 4:
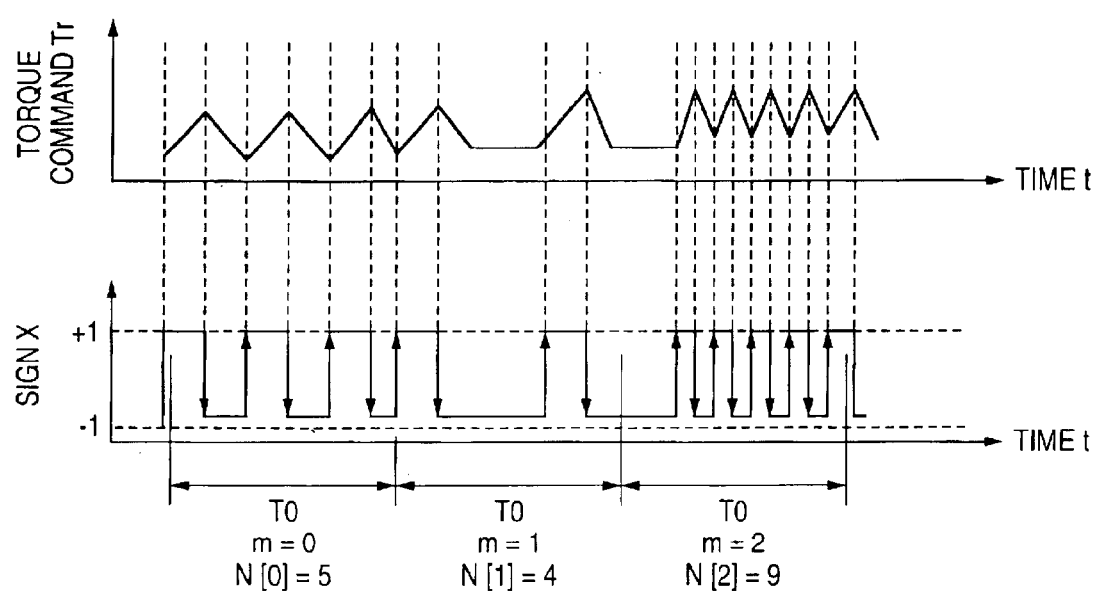
FIG. 4 is a graph showing an inverted state of signs of a difference between the present torque command and the previous torque command with respect to fluctuations in the torque command according to the method for detecting oscillation criticality of a servo control system according to the embodiment of the invention.

For example, a variation in the torque command Tr is as shown in FIG. 4 where $M_0 = 3$, the number N[m] of times of inverting the sign with respect to a difference in the torque command at m=0 through 2 becomes 5, 4 and 9, wherein the average value <N> of N[m] becomes (5+4+9)/3=6. Then, the shaking amount σ can be obtained as shown below.

$$\sigma = [\{(5-6)^2 + (4-6)^2 + (9-6)^2\}/3]^{1/2} = 2.16$$

Also, appointed time T0 in FIG. 4 is a product obtained by multiplying the number $I_0$ of sampling times by the sampling cycle Ts.

σ in Expression 1 is the standard deviation of the number N[m] (m=0 through $M_{0-1}$) of times of inverting the sign. The standard deviation is in connection with the frequency of the torque command Tr. The larger the frequency of the torque command Tr becomes, the larger the value of N[m] becomes, and the smaller the frequency of the torque command Tr becomes, the smaller the value of N[m] becomes. Therefore, the standard deviation of N[m] becomes one of the indexes expressing the unevenness of the frequency of the torque command Tr.

Next, the shaking amount σ obtained in Step S110 is compared with the appointed value $\sigma_0$ (Step S111). Where the shaking amount σ exceeds the appointed amount $\sigma_0$, it is judged that the servo control system is in oscillation criticality (Step S112), and where the shaking amount σ is less than the appointed shaking amount $\sigma_0$, it is judged that the servo control system is not in oscillation criticality (Step S113). Then, the process ends.

Further, in the method for detecting oscillation criticality of a servo control system according to the embodiment, the oscillation criticality is detected by obtaining the shaking amount σ of the torque command Tr. However, the oscillation criticality may be detected by obtaining the shaking amount of the speed feedback ω.

As described above, in the method for detecting oscillation criticality of a servo control system according to the embodiment, since, by obtaining the shaking amount of a frequency of oscillation of the torque command or the speed feedback, which is maximized when the mechanical system is in oscillation criticality, it is possible to adjust the control parameters without setting the control parameters being in the oscillation area in the servo control system 11, the control parameters can be adjusted without causing the servo control system to oscillate.

Also, in the method for detecting oscillation criticality of a servo control system according to the embodiment, the standard deviation value of the number N[m] of times of inverting the sign of a difference between the present torque command Tr[i] and the previous torque command Tr[i−1] is made into the shaking amount σ. The method is one method suitable for being mounted in a servo control system because the calculation is simple. However, various methods such as a high-speed Fourier transformation method (FFT), etc., are available in addition to the method for obtaining a shaking amount of a torque command Tr and speed feedback ω. The method for detecting oscillation criticality of a servo control system according to the embodiment does not regulate any of the methods for obtaining the shaking amount according to the invention. Also, the method for detecting oscillation criticality of a servo control system according to the embodiment may be applicable to not only a servo control system for which speed control is carried out, but also a servo control system for which position control is carried out.

The method for detecting oscillation criticality of a servo control system according to the embodiment is such that the control parameters are adjusted before the servo control system commences to operate. However, there are cases where a servo control system oscillates due to gradual changes of mechanical conditions during its operation. The method for detecting oscillation criticality of a servo control system according to the embodiment is easily applicable to real-time adjustment of control parameters, which is carried out when control conditions such as mechanical conditions change during the operation of a servo control system. For example, the servo control apparatus 11 is actuated as shown in the flowchart of FIG. 3 even during the operation of a servo control system, so that the shaking amount σ of a torque command Tr is obtained, and, where the shaking amount σ exceeds an appointed amount $\sigma_0$, the servo control apparatus 11 is actuated so that the value of the control parameter is changed to a value, which is changed by an appointed value from the present set value, judging that the servo control system is in oscillation criticality. In this case, the servo control apparatus 11 may obtain the shaking amount σ of the torque command Tr as shown in the flowchart of FIG. 3, and may obtain the shaking amount of the speed feedback, which is a value of control of the servo control system.

INDUSTRIAL APPLICABILITY

Where the method for detecting oscillation criticality of a servo control system according to the present invention is used, since it is possible to detect control parameters when the servo control system is in oscillation criticality, by obtaining the shaking amount when the oscillation frequency of a torque command or speed feedback fluctuate, which is maximized in the oscillation criticality area of the servo control system, such an effect can be brought about, by which the control parameters can be adjusted without causing the servo control system to oscillate.

What is claimed is:

1. A method for detecting oscillation criticality of a servo control system, comprising:

stepwise changing values of at least one control parameter, measuring a shaking amount of the control parameter, where the shaking amount is an unevenness in a frequency component of oscillations of said control parameter per value of the control parameters;

judging that, when said shaking amount exceeds an appointed value, the servo control system reaches oscillation criticality; and adjusting said control parameters by returning the values of the control parameter by only appointed steps.

2. The method for detecting oscillation criticality of a servo control system according to claim 1, wherein said shaking amount is a value of a standard deviation of a number of times of inverting a sign of a difference in a value of said control parameter and the value of the control parameter during a previous sampling time during a predetermined number of samples.

3. A method for detecting oscillation criticality of a servo control system, comprising:

stepwise changing value of at least one control parameter, measuring a shaking amount of the control parameter, where the shaking amount is an unevenness in a frequency component of oscillations of a torque command per value of the control parameter;

judging that, when said shaking amount exceeds an appointed value, the servo control system reaches oscillation criticality; and adjusting said control parameters by returning the values of the control parameter by only appointed steps.

4. The method for detecting oscillation criticality of a servo control system according to claim 3, wherein said shaking amount is a value of a standard deviation of a number of times of inverting a sign of a difference in a value of said torque command and the value of the torque command during a previous sampling time during a predetermined number of samples.

5. A method for detecting oscillation criticality of a servo control system comprising:

measuring a shaking amount of at least one control parameter, where the shaking amount is an unevenness in a frequency component of oscillations of said control parameter during an operation of a servo control system;

judging that, when said shaking amount exceeds an appointed value, the servo control system reaches oscillation criticality; and automatically adjusting said control parameter changing values from present set values.

6. The method for detecting oscillation criticality of a servo control system according to claim 5, wherein said shaking amount is a value of a standard deviation of a number of times of inverting a sign of a difference in a value of said control parameter and the value of the control parameter during a previous sampling time during a predetermined number of samples.

7. A method for detecting oscillation criticality of a servo control system comprising:

measuring a shaking amount where the shaking amount is an unevenness in a frequency component of oscillations of a torque command during the operation of the servo control system;

judging that, when said shaking amount exceeds an appointed value, the servo control system reaches oscillation criticality; and automatically adjusting a control parameter by changing values from the present set values.

8. The method for detecting oscillation criticality of a servo control system according to claim 7, wherein said shaking amount is a value of a standard deviation of a number of times of inverting a sign of a difference in a value of said torque command and the value of the torque command during a previous sampling time during a predetermined number of samples.

* * * * *